Jan. 18, 1966 V. SACCO 3,229,853
LIQUID DELIVERING AND METERING APPARATUS
Filed Feb. 20, 1961 6 Sheets-Sheet 1

INVENTOR.
Victor Sacco
BY Rines and Rines
ATTORNEYS

Jan. 18, 1966  V. SACCO  3,229,853
LIQUID DELIVERING AND METERING APPARATUS
Filed Feb. 20, 1961  6 Sheets-Sheet 2

Inventor
Victor Sacco
by
Attorneys

Jan. 18, 1966  V. SACCO  3,229,853
LIQUID DELIVERING AND METERING APPARATUS
Filed Feb. 20, 1961  6 Sheets-Sheet 5

Inventor
Victor Sacco
by Rines and Rines
Attorneys

Inventor
Victor Sacco
by
Attorneys

Jan. 18, 1966 V. SACCO 3,229,853
LIQUID DELIVERING AND METERING APPARATUS
Filed Feb. 20, 1961 6 Sheets-Sheet 6

Inventor
Victor Sacco
by
Attorneys

3,229,853
LIQUID DELIVERING AND METERING APPARATUS
Victor Sacco, Revere, Mass., assignor of one-half to James Sacco, Saugus, Mass.
Filed Feb. 20, 1961, Ser. No. 90,545
6 Claims. (Cl. 222—66)

The present invention relates to apparatus for delivering liquid, such as oil, gasoline and the like, and metering the liquid so delivered, and to methods of operating the same. The invention relates more particularly to apparatus of this character for delivering oil, gasoline or other liquid from tanks mounted on delivery trucks. The present application is a continuation-in-part of a copending application, entitled, "Liquid-Delivering and Metering Apparatus and Method," Serial No. 754,845, filed August 13, 1958, which matured, on April 18, 1961, into Letters Patent 2,980,294.

In the said Letters Patent, there is disclosed a delivery truck upon which is mounted a tank having a plurality of compartments from which, in succession, oil, for example, is pumped into the storage tanks of householders and others, for use as fuel. The pump causes the oil to travel also through a meter, which meters the oil thus delivered into the storage tanks. When all or nearly all the oil becomes delivered from one of the tank compartments on the truck, however, and if the pump should continue to pump, through the meter, during the time required for the operator of the truck to disconnect from the empty tank compartment, and to reconnect to another tank compartment, air, instead of oil, would issue from the empty or nearly empty or substantially empty tank compartment. Traveling through the meter and into the storage tank, this air would produce a false reading or erroneous recording of the meter. For brevity the term erroneous recording will hereinafter be employed generally to designate such false metering.

It is customary to attempt to provide some protection for the meter against false or erroneous recordings by interposing an air release, separator or eliminator between the pump and the meter. The function of the air release, air separator, or air eliminator is theoretically to by-pass the air, before it reaches the meter. It is notorious, however, that the air release, separator or eliminator is not reliable, particularly under conditions where large quantities of air, at high velocities, are delivered, as occurs, for example, when the pump continues to pump out of an empty or nearly empty tank.

The invention of the said Letters Patent accordingly is concerned more particularly with preventing such false or erroneous recordings of the meter. According to one form of the invention disclosed therein, this result is attained by causing valves automatically to close the outlets of the respective tank compartments as soon as they become respectively empty, or as soon as the oil therein sinks to predetermined levels, even though they be not quite empty, and provision is made for thereupon automatically disconnecting the pump or performing some other suitable operation.

An object of the present invention is to provide a new and improved apparatus for protecting the meter of the delivery system against erroneous recordings arising out of the delivery of air through the meter.

Another object is to improve upon and simplify the apparatus disclosed in the said Letters Patent 2,980,294, with the ends in view of reducing the cost of manufacture, providing for easier installation and, at the same time, improving the efficiency.

A further object is to reduce to a minimum the use of electrical apparatus and connections and to rely, insofar as possible, upon more simple mechanical connections.

Still another object is to control the delivery of the liquid through the meter both manually and responsive to the pressure of the liquid itself as it is delivered to the meter.

Other and further objects will be explained hereinafter and will be more particularly pointed out in the appended claims.

According to the invention disclosed in the said Letters Patent, continued operation of the pump, after the closing of the valves of the tank compartments, results in creating suction. This suction is utilized to actuate a switch, for example, or a piston in a cylinder, or other suitable mechanism. According to a feature of the present invention, as is disclosed also in the said Letter Patent, this suction is utilized promptly to close the meter valve. This closing prevents the further delivery of fluid, whether liquid or air, through the meter, and erroneous recordings thereof become thus prevented.

The present invention may dispense, however, with all the valves of the various tank compartments or their equivalents disclosed in the said Letters Patent. It may dispense also with the high-pressure and low-pressure switches and related apparatus and connections or their equivalents disclosed in a further copending application, entitled, "Liquid Delivering and Metering Apparatus and Method," Serial No. 50,551, filed August 18, 1960. According to a further feature of the invention, therefore, the path of delivery of the oil or other liquid from the tank compartment through the meter is normally maintained closed; and it can not become opened until the meter valve is opened. According to another feature of the invention, the path of delivery of the oil or other liquid may be opened manually, and it will be maintained open as soon as the pump starts to deliver the liquid out of the tank compartment.

In accordance with one of the specific embodiments of the invention that are herein illustrated and described, this result may be attained by: first, manually opening the normally closed path of delivery of the liquid; and, secondly, subjecting a mechanical control apparatus to the high pressure exerted by the liquid itself, as this liquid begins to be delivered by the pump out of the tank compartment for the purpose of maintaining this path open.

The particular said mechanical control apparatus that is illustrated and described herein comprises a mechanical control member that is normally biased, by spring pressure exerted by a strong controlling spring, to a normal ineffective position. In response to the pressure exerted by the liquid itself, as this liquid begins to become delivered by the pump from the tank compartment, however, the control member becomes actuated out of its normal, ineffective, position into a position in which it becomes effective. In this effective position, after the normally closed path has become opened manually, the mechanical control apparatus becomes effective to maintain the path open automatically, in order to permit the delivery of the liquid by the pump out of the tank compartment and to and through the meter.

In due time, the tank compartment will become nearly or wholly or substantially emptied. This, of course, will result in air, instead of oil, becoming now delivered by the pump out of the tank compartment along the path. Becoming thus relieved of the high pressure to which it had up to that time been subjected by the liquid pumped out of the tank compartment, the mechanical control apparatus thereupon returns to its normally ineffective condition and the path of delivery of the liquid through the meter, therefore, becomes reclosed. This renders it impossible to deliver any further fluid, whether air or liquid, from the tank compartment to and through the meter. The meter becomes thus protected against erroneous recordings or readings arising out of delivery of air therethrough.

The invention may be practiced in a number of specifically different ways. According to one embodiment of the invention, the mechanical control appartus is rendered effective, responsive to the pressure exerted by the liquid as the liquid is delivered from the tank, to maintain a normally closed meter valve open after it has first been opened manually; and this valve becomes reclosed promptly upon the occurrence of the before-described low-pressure conditions arising out of the delivery of air instead of liquid out of the tank compartment. According to a further embodiment of the invention, the mechanical control apparatus may automatically disconnect the pump promptly from its source of power under these low-pressure conditions. According to still a further embodiment of the invention, the truck motor may also become disconnected from its source of power, along with the pump. The truck motor may, however, be permitted to continue running, with the pump alone disconnected.

The invention will now be more fully described in connection with the accompanying drawings, in which FIG. 1 is a side elevation, with parts broken away, and many other parts omitted, for clearness, of a truck on which is mounted an oil tank provided with one embodiment of the oil delivering and metering apparatus of the present invention, the delivery being shown effected by means of a pump;

Figure 1:
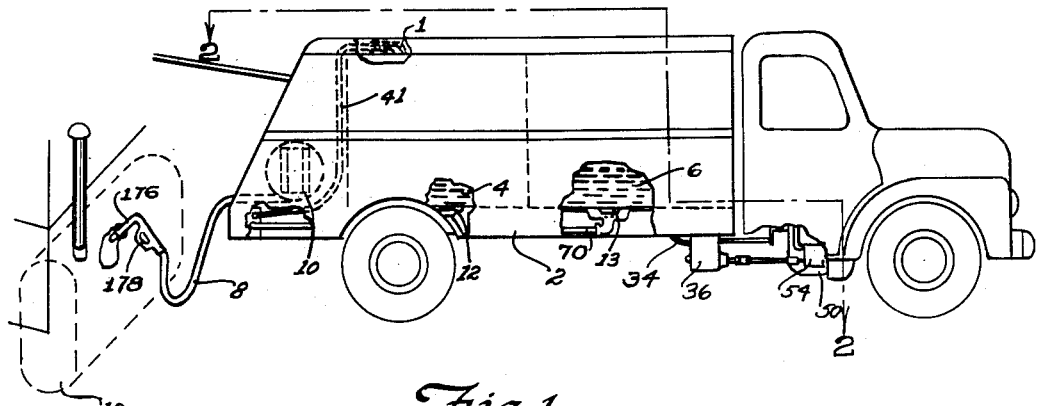

Referring first to FIGS. 1 to 6, inclusive, and 10 to 13, inclusive, there is illustrated therein, as in the drawings of the said Letters Patent and the said copending application, Serial No. 50,551, before referred to, a truck 2, upon which is mounted a tank comprising two tank compartments 4 and 6 for containing the liquid, assumed here, for definiteness, to be oil. The invention is equally applicable for use with only a single tank compartment 4, or with more than two tank compartments 4 and 6, but the two tank compartments 4 and 6 are illustrated herein for purposes of explanation of the invention.

Each tank compartment may be provided with a vent, which may, for example, be positioned at its dome cover 1, for the entry of air thereinto during the delivery therefrom of the oil contained therein.

One end of a delivery hose 8, rolled upon a reel 10, may be connected, by mechanism more fully described hereinafter, to either the circular outlet 12, at the bottom of the tank compartment 4, or to a similar circular outlet 13, at the bottom of the tank compartment 6. For the present, it will suffice to say that the outlet 12, at the bottom of the tank compartment 4, is connected to a pipe 16, which constitutes a connection to the tank compartment 4, through which to deliver the oil therefrom. The connection pipe 16, in turn, is connected to a pipe 14. A nozzle 176 at the other end of the hose 8 is shown in FIG. 1 emptying into a storage tank 18, for an an oil burner, at the home of a householder.

The nozzle 176 of the hose 8 is normally maintained closed; and it is opened, when it is desired to deliver oil therethrough, into the storage tank 18, by a check or trigger lever 178.

Figure 10:
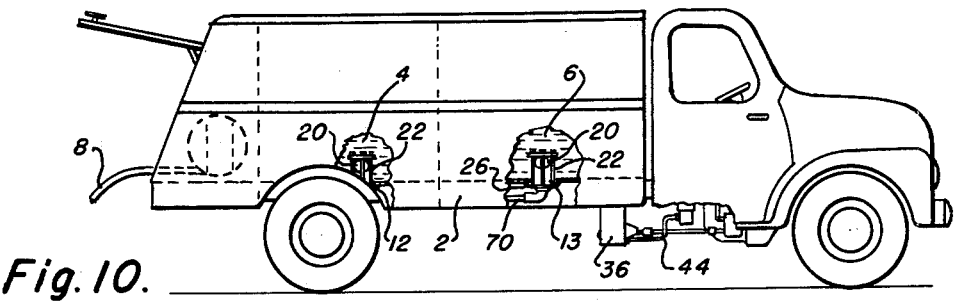
FIG. 10 is a view similar to FIG. 1 of a further modification, disclosed also in the said Letters Patent.
Figure 11:
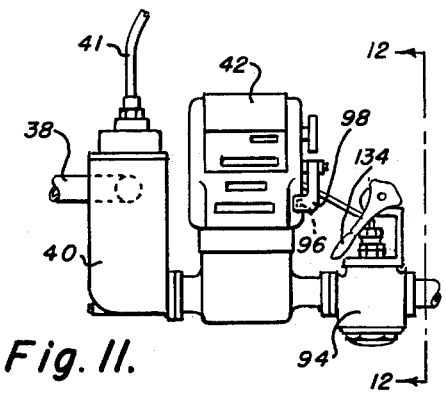
FIG. 11 is a fragmentary side elevation of apparatus disclosed in the said Letters Patent as utilizable with the modification of the invention illustrated by FIG. 10.
Figure 12:
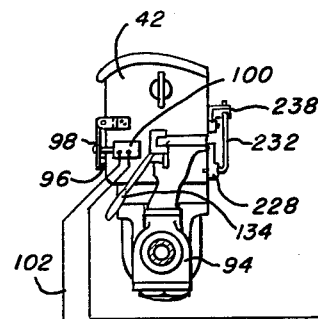
FIG. 12 is a section taken upon the line 12—12 of FIG. 11, looking in the direction of the arrows.
Figure 12:
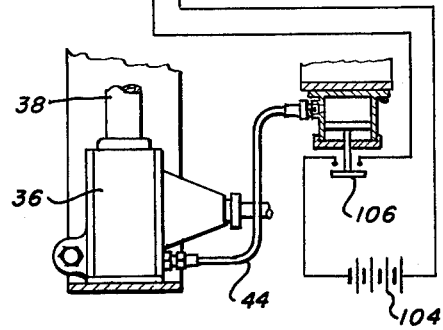
Figure 13:
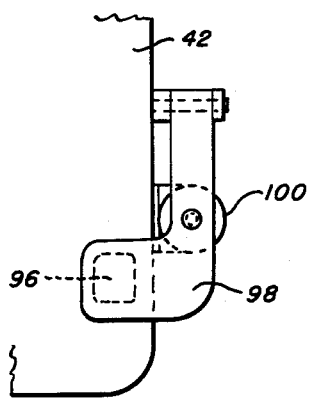
FIG. 13 is a front elevation, upon a larger scale, of parts of the apparatus shown in FIG. 11.

In FIG. 10, as in the drawings of the said Letters Patent, the outlet 12, at the bottom of the compartment 4, is shown closable by an air-tight float-valve 20. This float-valve 20, of course, will tend to rise to the level of the oil contained in the tank compartment 4. As disclosed more fully in the said Letters Patent, it may be guided in its rising and falling floating movements, with the oil contained in the tank compartment 4, within a cage, shown constituted of four equally spaced vertically disposed guiding rods 22. At their lower ends, the guiding rods 22 may be secured to the floor of a substantially cup-shaped sump 26, which may be welded to the bottom of the compartment 4. Further details of construction are disclosed in the said Letters Patent.

Figure 2:
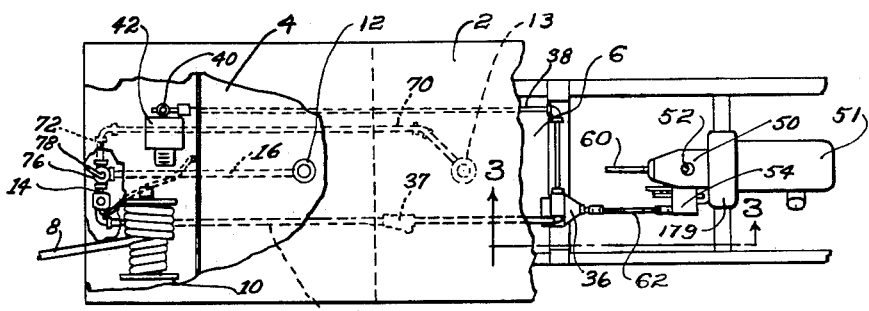
FIG. 2 is a horizontal section, taken upon the line 2—2 of FIG. 1, looking downward, in the direction of the arrows, additional parts being shown broken away.

Unlike the invention of the before-described Letters Patent, however, the outlets 12 and 13, at the bottom of the respective compartments 4 and 6, are shown in FIGS. 1 and 2 always open, as is shown also in the drawings of the said application, Serial No. 50,551. They are not provided with any valves for closing them when the respective tank compartment 4 and 6 become emptied.

The pipe 14 is shown connected, by a pipe connection 34, to a normally ineffective pump 36. The pump 36 is illustrated as of the rotary, continuously operated, type. As is well known, it is desirable to keep air out of this type of pump, and to have it operate on liquids only. The volume of the pipe connection 34, which is shown diagrammatically, may be larger than is provided by a pipe. For definiteness, it may be referred to as a pump-connection chamber. A strainer, shown diagrammatically at 37, may be interposed in the pump-connection chamber 34, between the pipe 14 and the pump 36, for filtering out grit and other impurities from the oil.

The suction side of the pump 36 becomes thus connected to the outlet 12 by way of the connection pipes 34, 14 and 16. The pump 36 will therefore become effective, and will operate to deliver oil from the tank compartment 4, through the outlet 12 and by way of the connection pipes 16, 14 and 34, into a discharge or pressure pipe system 38, on the compression or pressure side of the pump 36. The pipe 38 is shown connected to a conventional air release, air separator or air eliminator 40 that is connected to a meter 42, to which, in turn, is connected a conventional normally closed meter valve 94. A suitable meter, for example, is illustrated and described in Letters Patent 2,286,411, issued June 16, 1942, to Neptune Meter Company, as assignee of Charles S. Hazard. These meters are sold, on the market, with the air release, air separator or air eliminator 40 and the valve 94 annexed thereto, and also with a mechanism for stopping the operation of the meter 42 at a predetermined setting of the meter.

The meter valve 94 may be opened manually by a hand-operated lever 134, and it may be designed to close automatically after tthe amount of oil has been delivered, through the hose 8, for which the meter 42 has been pre-set. There is shown also a conventional meter trip button 96 for shutting off the delivery of the oil at any time, at will. In the absence of the operation of this trip button 96, the path of delivery of the oil from the tank compartment 4, by way of the pressure system 38, to and thorugh the air separator or eliminator 40 and the meter 42, is normally closed.

According to the embodiments of the invention that are illustrated by FIGS. 1 to 6, and 10 to 13, inclusive, as will hereinafter appear, the meter trip button 96 may automatically become actuated, in order to close the path of delivery of the oil, when a substantial amount of air commences to become delivered from the tank compartment.

Figure 4:
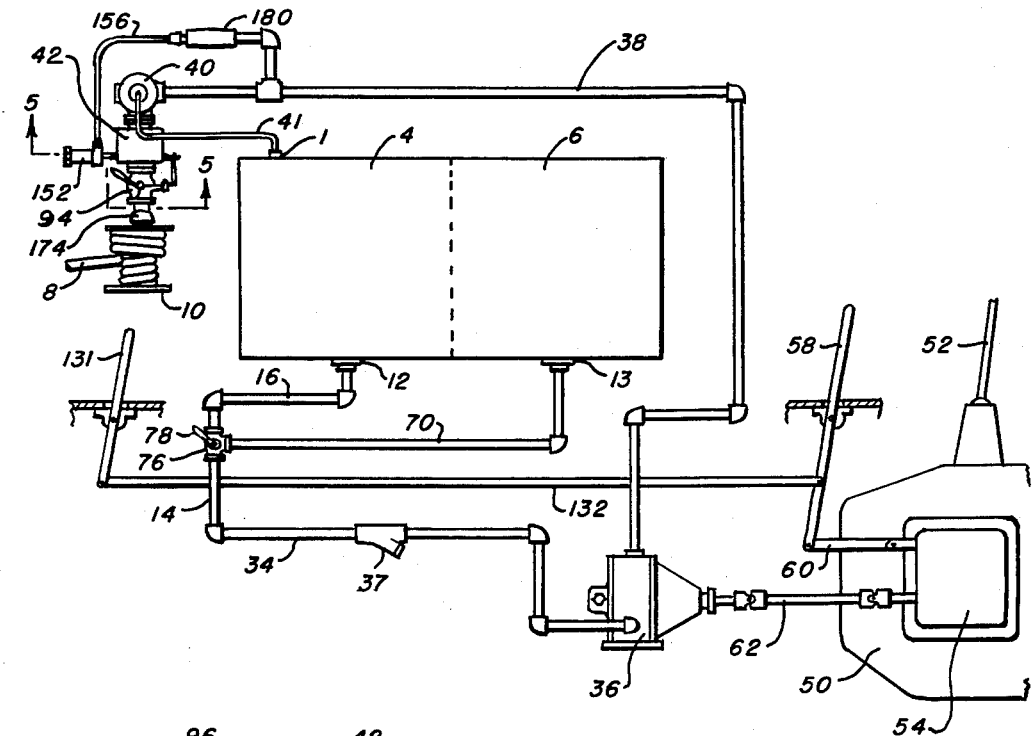
FIG. 4 is a schematic view of the embodiment of the invention illustrated by FIGS. 1, 2 and 3, many of the parts, however, that are omitted, for clearness, from FIGS. 1, 2 and 3, because of the smallness of the scale thereof, being shown therein.
Figure 7:
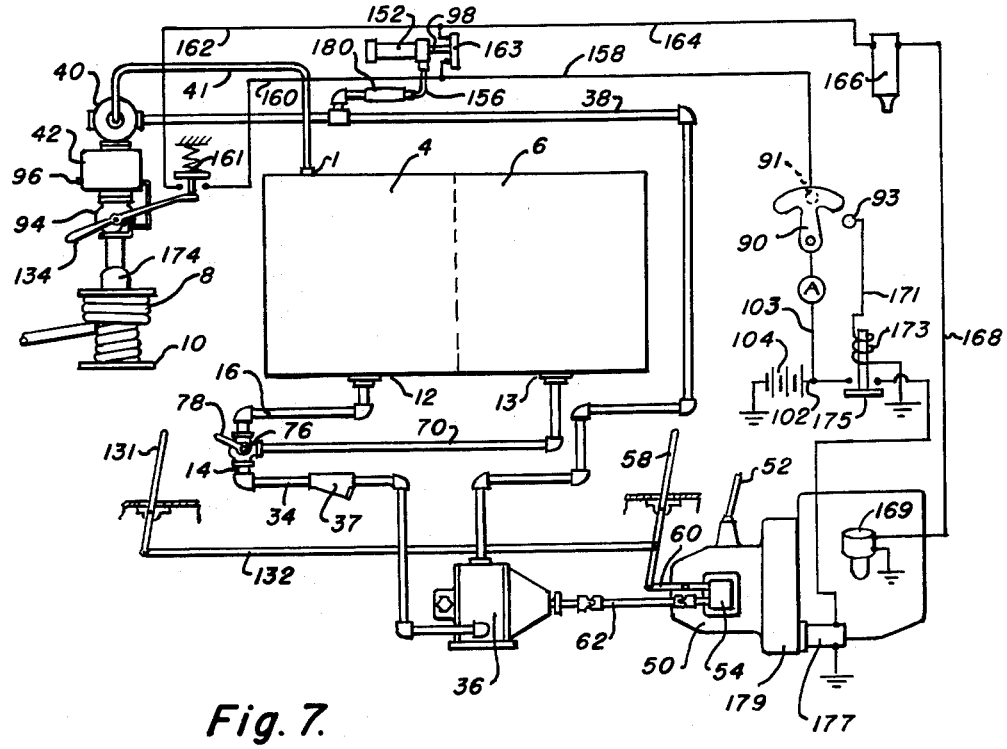
FIG. 7 is a view similar to FIG. 4 of a modification.

As illustrated in FIGS. 1, 4 and 7, the air release or air separator or air eliminator 40 may be connected to the air in the upper part of the compartment 4 by a vent-line pipe 41. The air release 40 may be provided with a float-valve, not shown, the float of which will drop when sufficient air accumulates. This dropping of the float is intended to open the float-valve, in order to allow the accumulated air to vent back into the tank compartment 4. The meter 42 is connected to the first-named end of the hose 8.

The pressure system 38, the air eliminator 40, the meter 42 and the valve 94 are thus connected in the path of delivery of the oil from the tank compartment 4, on the pressure side of the pump 36, in order that the oil may be delivered to and through the air eliminator 40 and the meter 42. In accordance with several embodiments of the present invention, however, as will be explained more fully hereinafter, this path of delivery of the oil from the tank compartment 4 is normally maintained closed by normally maintaining the meter valve 94 closed.

It is in this manner that, after the meter valve 94 has been opened manually, the oil may be delivered from the tank compartment 4, through the outlet 12, by way of the connection pipes 34, 14 and 16 and the pressure system 38, and through the air release 40, the meter 42 and the valve 94, into the householder's storage tank 18. By reason of this travel of the oil through the meter 42, during its delivery from the tank 4, the meter 42 becomes enabled to meter the oil delivered from the tank 4.

Everything that has been described above in connection with the tank compartment 4 could equally well have been described in connection with the tank compartment 6. The outlet 13, in the bottom of tank compartment 6, is shown connected to a pipe 70, which corresponds to the pipe 16, that is connected to the outlet 12 of the tank compartment 4. The pipe 70 is shown, in FIG. 2, connected to a pipe 72, in the same manner that the pipe 16 is shown connected to the pipe 14. In FIGS. 4 and 7, however, the pipe 70 is diagrammatically shown connected to the same pipe 14. The pipe 70 is therefore connected to the pipe 34, similarly to the connection thereto of the pipe 16.

By providing the two tank compartments 4 and 6, instead of only a single compartment 4, therefore, provision is made for connecting the pump 36 to the tank compartment 6 promptly after the compartment 4 has become emptied. It is desirable, however, that only one of the two tank compartment 4 and 6 be connected to the pump 36 at one and the same time.

This result may be attained by connecting both the pipe 16 and the pipe 70 or 72, that are respectively connected to the respective outlets 12 and 13 of the tank compartments 4 and 6, to a single two-position manifold or plug or meter valve 76. By means of a manually operable handle 78, the two-position manifold valve 76 may be connected to either the pipe 16 or the pipe 70 or 72. These two positions may be described as the two open positions of the manifold valve 76. In one of these two open positions of the handle 78, as illustrated more fully in the said Letters Patent and the said copending applications, Serial No. 50,551, the two-position manifold valve 76 connects the pump 36 to the pipe 16, and disconnects it from the pipe 70 (FIGS. 4 and 7) or 72 (FIG. 2). In the other open position of the handle 78, the two-position manifold or plug valve 76 connects the pump 36 to the pipe 70 or 72, and disconnects it from the pipe 16. Though there is also a third position of the manifold valve 76, in which it is closed, it will be convenient to refer to the manifold valve 76 as a two-position valve, because it may occupy either of the two open positions.

If desired, a pulsation absorber 180 may be inserted at a suitable point in the pressure system. As explained in the said applications, Serial No. 50,551, the pulsation absorber may be of any desired type, such as the model D-250 or D-549, described in bulletin G-14, page 46, of the Meriam Instrument Company, 10920 Madison Avenue, Cleveland 2, Ohio.

As already stated, the function of the air release 40 is theoretically to keep air out of the meter 42, thereby to prevent a false or erroneous meter recording or reading. As also before stated, however, the air release 40 does not operate efficiently. After the compartment 4 or 6 empties, therefore, there is danger that false or erroneous recordings or readings may be obtained in the meter 42, caused, particularly in the embodiments of the invention illustrated by FIGS. 1 to 9, inclusive, by the air that the pump 36 continues to pump out of the empty or nearly or substantially empty tank compartment 4 or 6, and through the meter 42. This difficulty, as before explained, is entirely overcome by the inventions of the before-mentioned Letters Patent and copending application, Serial No. 50,551.

According to the invention described in the said copending application, Serial No. 50,551, however, this same result is attained without the aid of any valves for closing the openings 12 and 13; and provision is made for terminating the operation of the pump 36 as soon as the oil becomes all or nearly all or substantially pumped out from the respective compartments 4 and 6. It therefore becomes impossible to deliver any further fluid, whether oil or air, through the meter 42 and it accordingly becomes impossible also to introduce any errors in reading or recordings of the meter 42, such as, prior to the inventions of the said Letters Patent, had theretofore been caused by the pump 36 pumping air out of the empty or substantially empty tank compartment 4 or 6. The same may occur when, instead of the oil becoming all pumped out of the compartment 4, it falls to a predetermined level therein, as is also described in the said Letters Patent.

Figure 5:
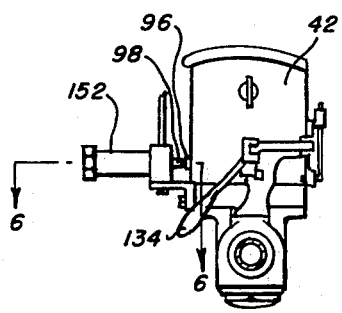
FIG. 5 is a vertical section, upon a larger scale, taken upon the line 5—5 of FIG. 4, looking upward in the direction of the arrows.
Figure 6:
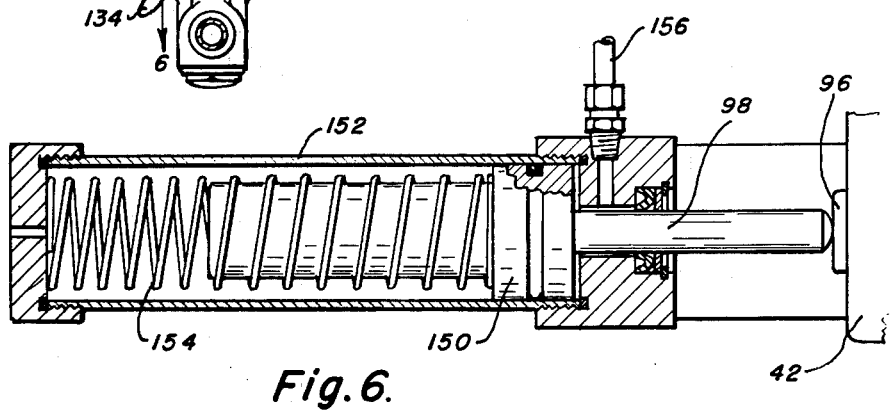
FIG. 6 is a vertical section, upon a still larger scale, taken upon the line 6—6 of FIG. 5, looking downward, in the direction of the arrows.

According to the embodiment of the invention illustrated diagrammatically by FIGS. 4, 5 and 6, this result is obtained with the aid of a mechanical control apparatus comprising a control piston 150, mounted in the chamber of a cylinder 152. A strong coil spring 154, located in this chamber at one side of the piston 150, shown as the left-hand side in FIG. 6, biases the piston 150 so as normally to occupy an ineffective position in the portion of the chamber at the extreme other or right-hand side of the piston 150. A suitable such cylinder-piston arrangement, for example, is the A–315–ES model of the Airoyal Mfg. Co., 1990 Springfield Avenue, Maplewood, New Jersey.

The said extreme right-hand portion of the chamber of the cylinder 152, as shown more particularly in FIGS. 4 and 6 to 9, is connected to the pressure system 38, so as to be subjected to the pressure of the pump 36. This result may be attained by, for example, connecting it to the pressure system 38, as by means of a side or branch pipe connection 156 of the path of delivery of the oil from the tank compartment 4 or 6.

The spring 154 biases the piston 150 to its extreme right-hand normal ineffective position in the chamber of the cylinder 152. In this extreme right-hand normal ineffective position of the piston 150, a projection 98 thereof engages the button 96 of the meter 42, in order normally to close the meter valve 94. The result is normally to close the path of delivery of the oil from the tank compartment 4 or 6, by way of the pressure system 38, to and through the air eliminator 40 and the meter 42, so as to prevent the delivery of any liquid from the tank.

This normally closed path of delivery may, however, be opened manually, after which it will be maintained open automatically, as soon as the pump 36 commences to pump the oil out of the tank compartment 4 or 6. This will be understood from the following description of the operation:

Assuming that, normally, the truck motor 50 and the pump 36 are ineffective, and that it is desired to start them operating, the driver of the truck 2 will first close the truck switch, not shown in FIG. 4, but shown diagrammatically at 90 in FIG. 7. This will result in establishing the circuits of the truck motor 50, from any suitable source of power, such as a storage battery 104 or a truck gas engine, diagrammatically shown at 51 in FIG. 2. The fly-wheel housing of the motor 50 is shown at 179. The starting of the truck motor 50 may then be effected by actuating the conventional manually operated lever 52, at the front of the truck 2, out of its neutral position.

Though the truck motor 50 has thus been started, and is operating, the pump 36, however, is not yet operating. It may be set into operation as now to be described.

Figure 3:
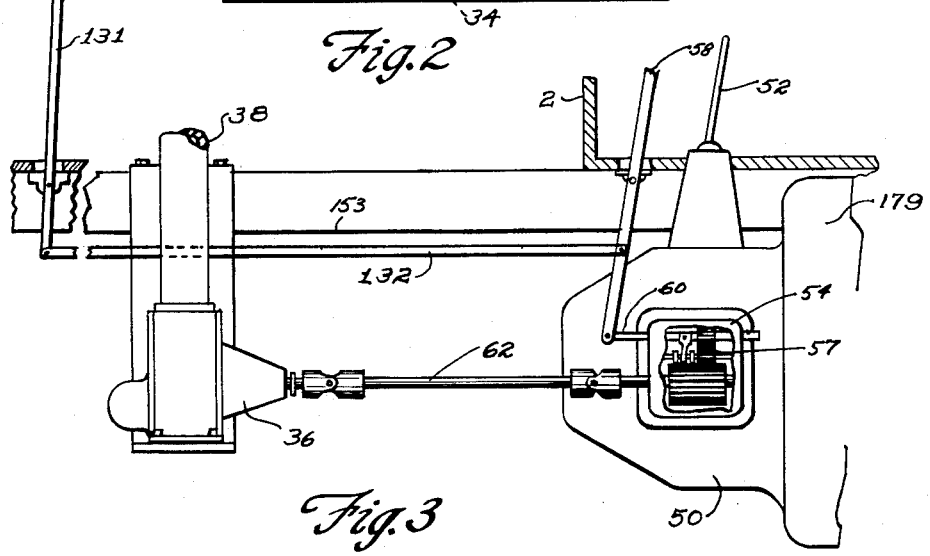
FIG. 3 is a fragmentary vertical longitudinal section, upon a larger scale, taken upon the line 3—3 of FIG. 2, looking upward, in the direction of the arrows.

The motor 50 is shown provided with a power take-off 54, that may be connected, by connecting transmission gearing means 57, shown more particularly in FIG. 3, under the control of a power-take-off manually operated shift lever or handle 58 and a link mechanism 60. The pump 36 is shown connected to the gearing 57 by driving shafts and a universal joint, indicated generally at 62. The lever 58 may be connected, by a link 132, to a manually operated lever 131, at the rear of the truck. By shifting the lever 131 in opposite directions at the rear of the truck, therefore, it becomes possible to engage and disengage the power take-off 54 at the rear of the truck, the same as through the medium of the lever 58, at the front of the truck.

After the motor 50 has been set into operation, to drive the truck 2, by the manipulation of the truck switch 90 and the lever 52, therefore, the power-take-off lever 58 or 131 may be actuated to the left, as viewed in FIGS. 3, 4 and 7, to connect the pump-operating gearing 57 to the motor drive, in order to set the pump 36 also into operation. The pump 36 will then start operating, to apply pressure to the pressure pipe system 38. It will not, at this time, however, pump any oil from either tank compartment 4 or 6 if the two-position manifold or plug valve 76 occupies its before-described third or closed position, to which it has been actuated after the last previous delivery of oil.

With the pump 36 thus set into operation, it commences to deliver oil out of the tank compartment 4 or 6, and the pressure thereupon begins to build up in the pressure system 38. This pressure of the oil in the pressure system 38 becomes communicated, by way of the side or branch pipe connection 156, FIG. 4, to the portion of the chamber of the cylinder 152 at the extreme right of the piston 150, as viewed in FIG. 6. As soon as the pump 36 builds up this pressure of the oil to a value in excess of the force for which the coil spring 154 has been adjusted it will actuate the piston 150 out of its normal ineffective illustrated position, to the left, in opposition to the biasing force exerted by the spring 154. In this effective position of the piston 150, the projection 98 thereof will thereupon become disengaged from the meter button 96, and the meter valve 94 may then be opened manually. This will result in opening the normally closed path for the delivery of the oil out of the tank compartment 4 or 6, by way of the corresponding opening 12 or 13, into the pressure system 38; and, from this pressure system, to and through the air eliminator or separator 40 and the meter 42.

It will be observed that this operation will take place in opposition to the biasing action of the spring 154, solely in response to the pressure of the oil itself, produced by the pump 36, as it commences to deliver the oil out of the tank compartment 4 or 6. It is through the medium of this pressure of the oil itself that, after the path of delivery of the oil from the tank compartment 4 or 6 to and through the air eliminator 40 and the meter 42 has become opened manually, by manually opening the normally closed meter valve 94, that it is thereafter maintained open automatically.

It will be observed further that the meter 42, the normally closed valve 94 and the mechanical control apparatus comprising the control piston 150, mounted in the chamber of the cylinder 152, the control spring 154, and related parts are positioned at a single location upstream of the hose 8, is illustrated, for example, in FIG. 4. The liquid becomes thereby delivered from the tank 4 or 6 along the before-described normally closed path to and through the meter 42 and the valve 94 to the delivery hose 8 when the valve 94 becomes manually opened.

The spring 154 may be adjusted manually to operate at, for example, 20 to 30 pounds per square inch. It has been found that the apparatus will operate satisfactorily, so as to conform to the tests required by government bodies, at these pressures.

The system, however, may be designed to withstand average pressures of 80 to 90 pounds when the two-position valve 76 occuplies its closed position, and 45 to 55 pounds when it occupies one of its two open positions.

To return to the description above, enough has not yet been stated to establish the delivery of the oil from the tank compartment into the householder's storage tank 18. It is necessary further for the driver: first, to actuate the manually operable lever 78, in order to allow the two-position valve 76 to assume one or the other of its two before-described open positions; and, then, also to operate the trigger 178.

The pump 36 will thereupon commence to pump oil out of the tank compartment 4 or 6, by way of its corresponding opening 12 or 13, and through the pressure system 38, the air separator or eliminator 40, the meter 42, and the meter valve 94, and through the nozzle 176 of hose 8, into the householder's storage tank 18.

The pump 36 will continue thus to pump oil out of the compartment 4 or 6 until that compartment becomes entirely or nearly or substantially emptied. The pump 36 will thereupon commence to pump air from that tank compartment. The pressure exerted by that air upon the right-hand end of the piston 150, as viewed in FIG. 6, will be less than the predetermined value for which the strength of the biasing spring 154 has been adjusted. That spring 154 will thereupon restore the piston 150 to its normal extreme right-hand position in the chamber of the cylinder 152. The projection 98, at the right-hand end of the piston 150, will thereupon re-engage the button 96 of the meter 42 to effect the reclosing of the valve 94. This will result in completely reclosing once more the path of delivery of any further fluid, whether air or oil, through the meter 42 and the valve 94.

According to the embodiment of the invention illustrated by FIGS. 10 to 13, false recordings are prevented in the meter 42, upon the oil becoming substantially all pumped out from the tank compartment 4 or 6, by the float-valve 20 thereupon becoming seated, to close the outlet 12 or 13. It will then become impossible for the pump 36 to pump any further fluid, whether oil or air, out of the compartment 4.

A small-diameter tubing pipe 44 is shown connected to the suction side of the pump 36, so as to be subjected to the same vacuum-producing or suction-producing action by the pump 36 to which the pipe 34 is subjected. The pipe 44, therefore, may contain oil pumped out of the compartment 4, the same as the pipes 16, 14 and 34. This oil will travel, by way of the pipe 44 to a normally open vacuum switch 106.

As soon as the float-valve 20 becomes seated to close the outlet 12 or 13, therefore, the pump 36, since it continues to operate, and since it can no longer pump any further fluid out of the tank compartment 4, will now produce an increased vacuum or suction effect, to suck oil or air out of the vacuum switch 106. This vacuum switch 106 is shown connected in a circuit 102, having an energizing battery 104, under the control of a solenoid 100. The vacuum switch 106 effects the operation of the lever 98, to press the button 96, which, as before described, causes the meter valve 94 to close. The meter 42 thereupon stops recording.

This increased suction or vacuum effect, it will be observed, is produced at the suction side of the pump 36. If the operation were from the discharge or compression side of the pump 36, there would be danger of the pump 36, if it were powerful enough, forcing enough air to raise the float-valve 20.

According to the embodiments of the invention thus far described, and as illustrated in FIGS. 1 to 6, and 10 to 13, therefore, the meter 42 is protected against false readings or erroneous recordings without stopping the operation of either the pump 36 or the truck motor 50. These may, therefore, continue to operate without in any way introducing errors into the recording of the meter 42. The pump 36 may be protected against injury arising out of excessive pressure caused by its continued operation through the medium of the customary by-pass, not shown, or it may be provided with other safety features known to the art.

According to a modification, however, the pump 36 may itself be stopped operating when it commences to pump air out of the tank compartment 4 or 6. This result may be obtained by, for example, putting the power-takeoff shift lever 58 or some other pump-control member, such as the lever 131, instead of the valve 94, under the control of the mechanical control apparatus comprising the piston 150 and the cylinder 152.

Figure 8:
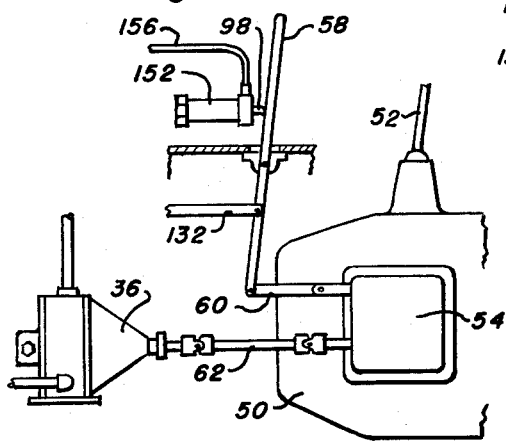
FIGS. 8 and 9 are fragmentary diagrammatic schematic views of further modifications.

In FIG. 8, for example, the projection 98 of the piston 150 is shown in engagement with the lever 58.

To start the operation of the system illustrated by FIG. 8, therefore, the pump 36 may be set into operation by holding the shift lever 58 against the projection 98. This will connect the pump-operating gearing 57 to the pump motor 50, as before described. The driver, after thus starting the operation of the pump 36, will hold this lever 58 in this actuated position, in opposition to the biasing force of the spring 154, until the pressure in the pressure system 38 builds up to a high enough value to actuate the piston 150 out of its ineffective normal illustrated position. After the pressure in the pressure system 38 builds up, the projection 98 will become actuated to the left, whereupon the driver may release the shift lever 58. Upon the pressure in the pressure system 38 falling, as the result of the delivery of air thereinto from the nearly emptied tank compartment 4 or 6, the piston 150 will become restored to its extreme right-hand position, whereupon the projection 98 will actuate the lever 58 to the right, thus automatically disconnecting the gearing from the pump motor 50. This will terminate the operation of the pump 36, and it will, again, therefore, become impossible to register any false or erroneous recordings or readings of the meter.

Though the modificaion of FIG. 8, like that of FIGS. 1 to 6, therefore, provides for protecting the meter 42 against false or erroneous recordings or readings, this result is attained, in the system of FIG. 8, merely by disconnecting the pump 36, and without terminating the operation of the truck motor 50, as well.

According to the modifications of this FIG. 8, therefore, the truck motor 50 will continue operating, ready for driving back the truck 2 under the control of the truck switch 90 and the lever 52, and this at at time when the pump 36 is shut off, so as not further to deliver any oil.

It is within the scope of the invention, however, to disconnect the truck motor 50 itself from its source of power under the conditions of low pressure before described. To this end, the projection 98 of the piston 150 may, for example, interrupt a circuit of the motor 50, or it may break the ignition circuit, or exert some other control on the motor 50. This will be understood from FIG. 7, in which a normally open switch 163 is shown under the control of the projection 98. In the normal position of this piston 150, therefore, the switch 163 is open. It is shown closed in FIG. 7 to represent the operating conditions.

Referring to this FIG. 7, it will be assumed that the truck switch 90 has been actuated into engagement with two contact members 91 and 93. This will result in establishing two circuits.

One of these circuits extends from ground through the truck battery or other source of power 104 and, by way of conductors 102 and 103, to the truck switch 90 and the contact member 91 in engagement therewith. An ammeter may be included in this circuit, as shown. The circuit will continue, by way of the contact member 91 and a conductor 158, to a normally closed switch 161, though shown open in FIG. 7. The circuit will continue, by way of conductors 162 and 164, to a truck coil 166. From the truck coil 166, the circuit will be completed to ground and the battery 104 by way of a conductor 168, and the ignition circuit and distributor 169.

The closing of this circuit, in response to the engagement of the contact member 91 by the truck switch 90, will result, of course, in energizing the truck coil 166, for controlling the operation of the distributor 169.

The other of the two circuits, which may be called the starter circuit, is the same up to the contact member 93, but continues, from there, through the contact member 93, by way of a conductor 171, through a coil 173, back to ground and the battery 104. The consequent energization of this coil 173 results in the closing of a starting-motor switch 175.

The circuit of the starting motor 177 becomes thereupon closed. It extends from ground, through the battery 104, by way of the conductor 102 and the switch 175, through the starting motor 177, back to ground. The starting motor 177 will thereupon engage momentarily the ring gear, not shown, on the fly wheel, not shown, in the fly-wheel housing 179.

The truck motor 50 may be connected to any suitable source of power, such as the storage battery or the truck gas engine that is diagrammatically shown at 51, and the starting thus may be effected by actuating the conventional manually operated lever 52, at the front of the truck 2, out of its neutral position, as before described.

Though the truck switch 90 may be maintained in engagement with the contact member 91, it is necessary for it to make only momentary contact with the contact member 93. Once the truck motor 50 has been started, the distributor 169 will remain in operation, and the truck motor 50 will continue operating, even though the truck switch 90 be disengaged from the contact member 93. In FIG. 7, therefore, the truck switch 90 is shown in engagement with the contact member 91 only, and disengaged from the contact member 93.

After the truck motor 50 has thus been started operating, the pump 36, the lever 78 and other parts may also be operated as already above described. The pressure of the oil delivered from the tank compartment 4 or 6 by the pump 36 will, in due time, as also before described, actuate the piston 150 to the left, as before described, thus effecting the closing of the siwtch 163.

The switch 163 is shown in FIG. 7 connected in parallel with the normally closed switch 161, by way of conductors 160 and 162. As soon as the pump 38 builds up the pressure in the pipe 38 of the pressure system to a value greater than the force exerted by the biasing spring 154, the piston 150 will become actuated by the pressure of the oil to the left, in order to close the switch 163, as shown in FIG. 7.

Oil will now flow into the householder's storage tank 18 as soon as the driver opens the normally closed meter valve 94 to open the path of this flow. This he may do by opening the normally closed meter valve 94 and the nozzle 176 of the hose 8. He may open the meter valve 94 by means of a manually operable lever 134 that, at the same time, opens also the switch 163.

The opening of the switch 163, of course, would tend to break the above-traced circuit of the coil 166. The circuit of this coil 166 to the source of power 104 has become re-established, however, as soon as the pressure system 38 has become raised to the before-mentioned value for which the spring 154 has been adjusted, by the switch 163. This is because, as before stated, the switch 163 is connected in parallel with the switch 161. The truck motor 50 and the pump 36, therefore, will continue operating, notwithstanding the opening of the switch 161.

It will be observed that the parallel-connected switches 161 and 163, the air eliminator 40 and the meter 42 are all connected, in the pressure system, to the pressure side of the pump 36, in order to subject them to the pressure exerted by the pump 36. The truck motor 50 is in this manner connected to its source of power, through the switches 161 and 163.

According to the operation of the embodiment of the invention illustrated by FIG. 7, therefore, the driver of the truck first manipulates the truck switch 90 and the lever 52, in the manner before described, to start the operation of the truck motor 50 by way of the switch 161. He then operates also the lever 58 (or 131) to connect the pump 36, through the transmission gearing 57, to the truck motor 50, whereupon the pump 36 will also start operating. The pressure in the pressure system 38 thereupon commences to build up. Upon the pressure in the pressure system 38 rising above the value of the force for which the spring 154 has been adjusted, the piston 150 will become actuated by this pressure to the left, to close the switch 163. The driver may now manipulate the lever 134 to open the meter valve 94, as hereinafter more fully described. This will result in also opening the switch 161, which, though not so shown, is mechanically connected to the valve 94 so as to operate therewith. The pump 36 will then begin to pump oil out of the compartment 4 or 6, as the case may be, and will continue to do so until that compartment becomes entirely or nearly or substantially emptied, whereupon the pump 36 will commence to pump air from that tank compartment. The pressure exerted by the pump 36 in the pressure system 38 will thereupon commence to sink, and when it reaches the predetermined value for which the spring 154 is adjusted, this switch 163 will become opened, thus interrupting the circuit of the distributor coil 166, and terminating the operation of the truck motor 50. The pump 36, since it is driven from this motor 50, through the gearing 57, will also thereupon stop operating. It will not thereafter, therefore, pump any fluid, whether oil or air, out of the emptied or substantially emptied tank compartment, through the air eliminator 40, the meter 42 and the meter valve 94; and the meter 42 will consequently not register any false recordings or readings.

The setting of the strength of the biasing spring 154 may be such as to stop the operation of the pump 36 when the tank compartment 4 or 6 to which it is connected becomes entirely emptied, or until the level of the oil in the tank compartment becomes lowered to a degree such that the pump 36 commences to deliver also a substantial amount of air from the tank compartment, even though the tank compartment is not entirely emptied.

Just as the spring 154, as described above, therefore, controls the operation of the valve 94 in the circuits of FIGS. 1 to 6, and of the pump 36, in the circuit of FIG. 8, so, it similarly controls the operation of the motor 50, in the circuit of FIG. 7.

It will be observed that it is in response to the thereupon consequent fall in the pressure exerted by the pump 36 on the pressure side of the pump that the truck motor 50 and the pump 36 connected thereto by the gearing 57 thereupon become disconnected from their source of power, thereby becoming rendered again ineffective.

According to the modification of the invention illustrated by FIGS. 1 to 6 and 10 to 13, the meter 42 is protected against false reading or erroneous recordings without stopping the operation of either the pump 36 or the truck motor 50. According to the modification of FIG. 8, the pump 36 alone is stopped operating when it commences to pump air out of the tank compartment 4 or 6; and according to the modification of FIG. 7, the pump 36 and the truck motor 50 are both disconnected under these conditions.

It is obvious, of course, that the systems of FIGS. 7 and 8 may be under the control, not only of the pump 36 and the motor 50, but also of the valve 94, as well.

Figure 9:
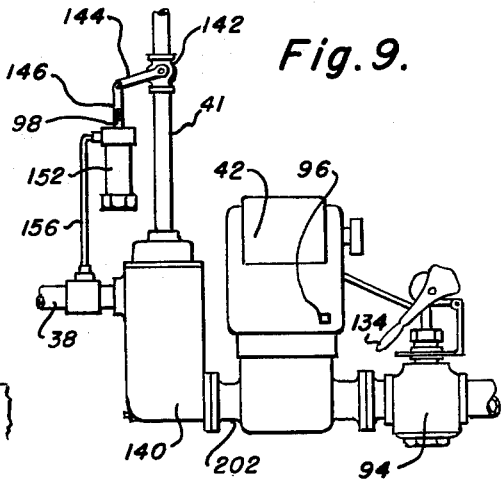

According to the modification illustrated by FIG. 9, the control apparatus described above is utilized to improve the operation of the present-day inefficient air eliminators 40. To this end, the conventional float and the conventional float valve controlled thereby are removed from the air-eliminator chamber, represented in FIG. 9 by the numeral 140, and a conventional valve 142 is inserted, instead, in the pipe 38 of the pressure system, between the chamber 140 and the pump 36. The valve 142 is actuated by means of a handle 144 that is linked, as shown at 146, to the before-described projection 98 of the piston 150.

reason why present-day air eliminators 40 do not operate It may be in order, at this point, to state that one efficiently is that the float valves thereof are expected to open when their controlling floats are expected to drop, by gravity, in response to air, instead of oil, entering the air-eliminator chambers, in response to the emptying of the tanks from which the oil is delivered. These expectations are based upon the assumption that the air that thereupon accumulates in the air-eliminator chamber will thus become enabled to escape through the thus-opened float-controlled valves. The theory appears to be sound, but the fact is that it does not work out, in practice.

The invention illustrated by FIG. 9 overcomes all these difficulties by eliminating altogether the float-controlled valves and the floats for controlling them. The control valve 142, of FIG. 9, which replaces the conventional float-controlled valve in the air eliminator, is under the control, instead, of the control apparatus above described, which, as appears from the above description, is positive in action and reliable. At the time of the installation of the apparatus, the handle 144 is positioned so as to close the valve 142 at a time when the pressure in the pressure system 38 is low. Thereafter, in operation, the piston 150 will operate, as before described, in response to the pressure in the pressure system 38. Under low pressures, at the commencement of the operation, the valve 142 will be maintained open until the pressure in the pressure system 38 builds up, whereupon it will close, and then reopen again under the conditions before described.

It is not necessary to control both the meter valve 94 and the valve 142. The meter valve 94 may still be operated manually, as under present-day conditions, and the valve 142 alone may be under pressure control, as above described. On the other hand, if the meter valve 94 is actually under this control, it is not necessary to include also the valve 142 and its control. Under such conditions of control through the medium of the meter valve 94 alone, however, it is still necessary to employ also the conventional air release or eliminator 40.

In the system of FIG. 9, therefore, the oil is delivered along a main path of delivery to and through the meter 42 when the pressure exerted thereby as it is delivered from the tank compartment is of a predetermined high value and it is diverted away from this main path along an auxiliary path including the chamber 140 by way of the valve 142 and the vent line pipe 41 when this auxiliary path is open back into the tank compartment 4 or 6 when the pressure of the liquid falls below this predetermined high value. This operation, unlike the operation in present-day air eliminators, takes place irrespective of the level of the liquid in the chamber 140 since it is not dependent upon the action of valves under the control of floats.

It may be observed also that the meter valve 94 may be positioned immediately at the left of the meter 42, as indicated at 202 in FIG. 9, equally as well as at the right thereof, without impairing the operation. It may not, however, be positioned at the left of the pipe connection 156, as observed in the same FIG. 9, for such positioning would subject the meter valve 94 to the travel of the air from the nearly empty tank compartment before such air could reach the control valve 142.

The preferred mechanism by means of which pressure upon the meter trip button 96 effects the closing of the meter valve 94 will now be described, with more particular reference to FIGS. 14 to 19, inclusive. In these FIGS. 14 to 19, and more particularly FIGS. 14 and 17, the meter structure is shown at the left, and the valve structure at the right, bolted together to constitute a meter-and-valve unit.

Figure 17:
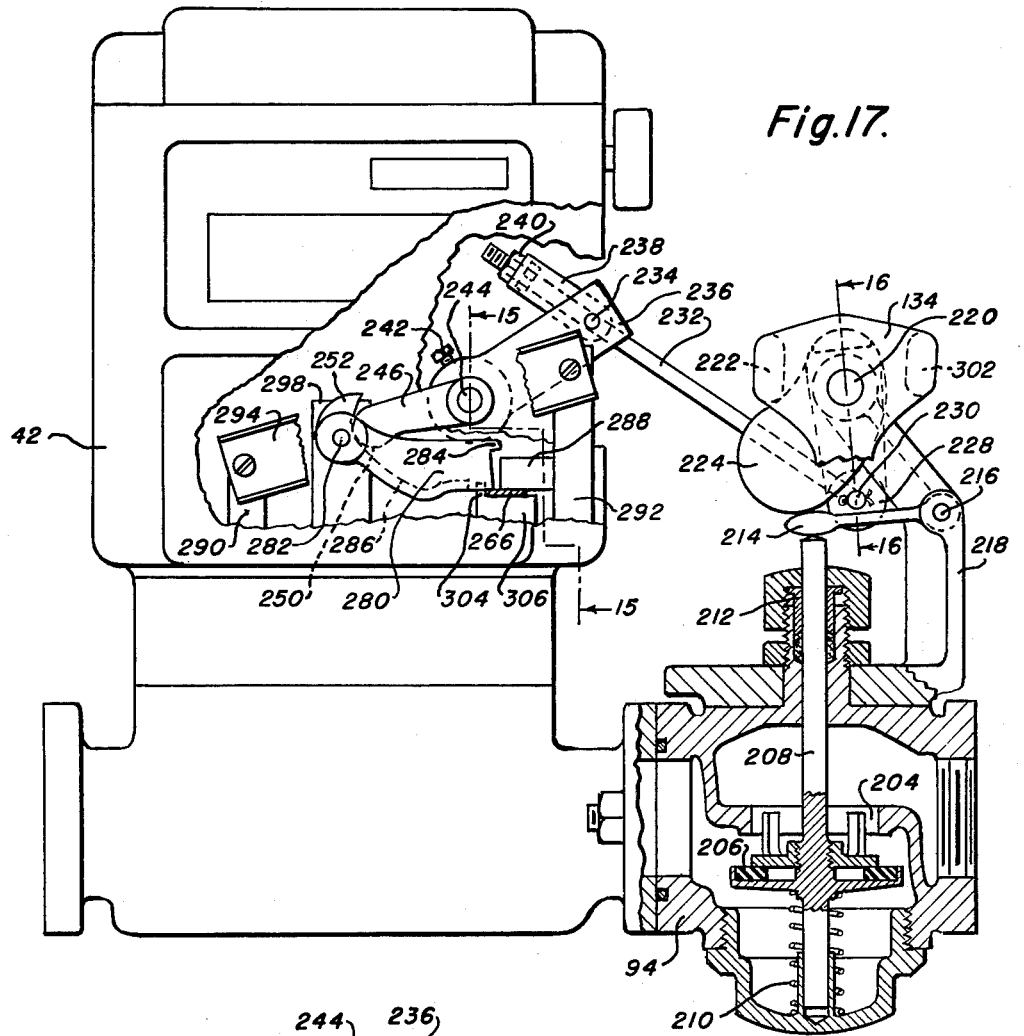
FIG. 17 is an elevation partially broken away and in vertical section, the section being taken upon the line 17—17 of FIG. 14, looking upward, in the direction of the arrows.
Figure 18:
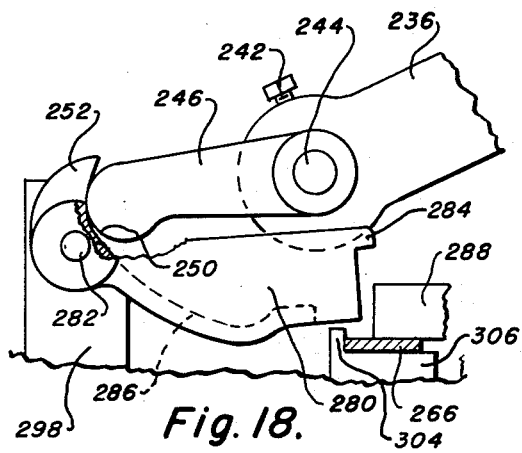
FIGS. 18 and 19 are views, upon an enlarged scale, of details.
Figure 19:
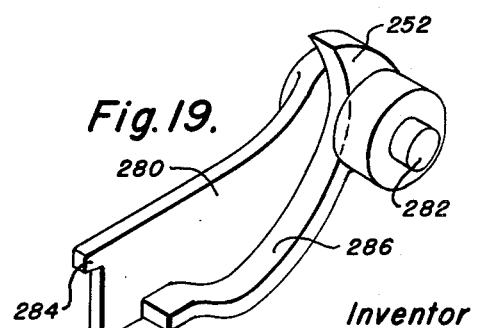

The meter valve 94 is shown more particularly in FIG. 17 provided with a valve-seat opening 204 and a valve disc 206 for closing this opening 204. The valve disc 206 is mounted upon a valve spindle 208. This valve spindle 208 is normally biased upward, as shown in FIG. 17, by a valve spring 210 in order normally to cause the valve disc 206 to close the valve seat opening 204. The spring 210 is shown in FIG. 17 surrounding the lower end of the valve spindle 208, the upper end of which is shown extending through a packing gland 212. The extreme free upper end of the valve spindle 208 is shown engaged by the left-hand end of a thrust lever 214, the right-hand end of which is pivoted at 216 to a yoke 218 of the meter valve structure. The before-described lever 134 for manually opening the meter valve 94 is shown fixed to a pivot rod 220 that is journaled to rotate freely in the same yoke 218. It may be manually actuated counter-clockwise, as viewed in FIG. 17, about the axis of the pivot rod 220, to open the meter valve 94, and it is actuated clockwise by the spring 210 when this meter valve 94 becomes closed.

In the normal closed position of the valve 94, in which the valve disc 206 closes the valve-seat opening 204, the valve spindle 208 is caused by the spring 210 to force the said left-hand end of the lever 214 pivotally upward about its pivot 216. When the lever 134, however, is actuated manually counter-clockwise, as above described, to open the meter valve 94, a shoulder 222 that is fixed thereto, at the left of the pivot 220, as viewed in FIG. 17, engages the upper face of a cam 224. The cam 224 is integrally provided at the front of a yoke 226 that is pivoted freely about the pivot rod 220 of the lever 134. By reason of the engagement of the cam 224 by the shoulder 222, therefore, the yoke 226 becomes actuated, with the cam 224, counter-clockwise about the pivot rod 220. The lower face of the cam 224 is thereupon caused to engage the said left-hand end of the lever 214, to force it downward about its pivot 216. This results in depressing the valve spindle 208, in opposition to the operation of the spring 210. The valve disc 206 becomes thus unseated from the valve-seat opening 204, thereby effecting the opening of the meter valve 94, and, therefore, the before-described path of delivery of the oil from the tank compartments.

The lever 134 is shown provided on the other side of its pivot 220, with an additional shoulder 302. The function of this additional shoulder 302 is to serve as a limit stop, by engaging the yoke 218 during the return clockwise pivotal movement of the lever 134 about the pivot rod 220.

Figure 14:
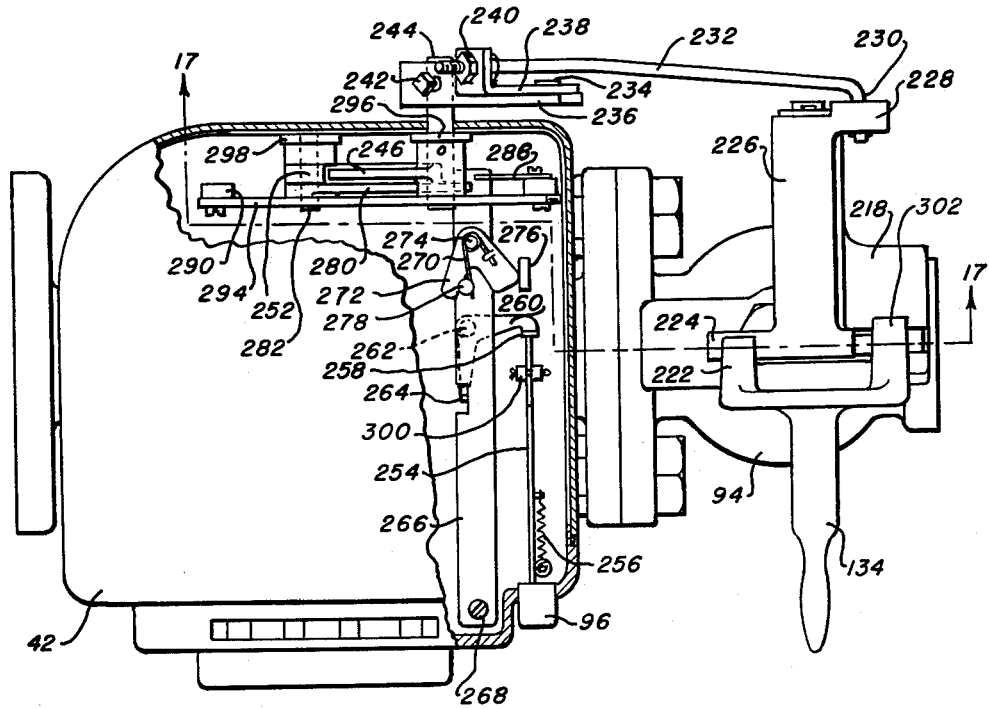
FIG. 14 is a plan of a preferred meter and meter valve, parts being shown broken away.
Figure 16:
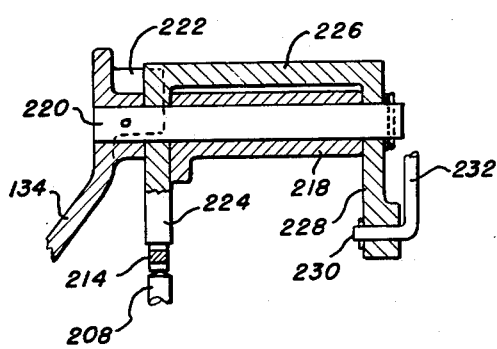
FIG. 16 is a section, but upon a larger scale, taken upon the line 16—16 of FIG. 17, looking in the direction of the arrows.

The rear of the yoke 226 is integrally provided with an arm 228, shown more particularly in FIGS. 14, 16 and 17, that is pivotally connected, at 230, to the right-hand end, as viewed in these FIGS. 14 and 17, of a connecting link rod 232, the left-hand end of which is shown connected to the meter 42. It is by means of this connection, after presetting the meter 42 for the delivery of any desired number of gallons of the oil, as before described, that it becomes possible to close the meter valve 94. It is by means of this connection also, as will now be more fully described, that it becomes possible automatically to close the meter valve 94 when the tank compartment 4 or 6 becomes substantially emptied.

To this end, the said left-hand end of the connecting link rod 232 is shown pivotally connected, at 234, to the free end of a connecting arm 236. The point of pivotal connection of the connecting link rod 232 to the said free end of the connecting arm 236 may be adjusted in any desired manner. As illustrated, this may be effected by interposing an arm 238, one end of which is adjustably secured to the said left-hand end of the connecting link rod 232 by means of threaded lock nuts 240, and the other end of which carries the pivot 234. The other end of the connecting arm 236 is fixed, as by means of a set screw 242, to a pivot rod 244. A cam arm 246 is fixed to the pivot rod 244 in any desired manner, as by means of a locking pin 248, shown more particularly in FIG. 15. The connecting arm 236 and the cam arm 246, therefore, in effect, constitute a bell-crank lever, pivoted about the axis of the pivot rod 244.

Brackets 290 and 292 are shown supporting a plate 294 in which and in a third bracket 296, the pivot rod 244 is journaled. A pivot rod 282 is journaled in the plate 294 and a fourth bracket 298.

When the connecting link rod 232 becomes actuated, in response to the before-described counter-clockwise actuation of the lever 134, therefore, it effects a clockwise turning movement of the bell-crank lever 236, 246 about the axis of the pivot rod 244. A cam 250 at the free end of the cam arm 246 is thereupon caused to ride up a cam shoulder 286 of a cam latch member 280, until it engages against the latch 252 thereof, as illustrated more particularly in FIG. 17. The bell-crank lever 236, 246 thus becomes locked in position, enabling the operator, therefore, to release the lever 134. The cooperating locking action between the cam 250 and the cam latch 252 will result in holding the connecting link rod 232 in the position to which it has become actuated by the manual counter-clockwise actuation of the lever 134. The meter valve 94 will thereupon be maintained open, in opposition to the operation of the valve spring 210, during the delivery of the liquid along the before-mentioned path out of the tank compartments.

It is now in order to explain how the meter valve 94 becomes reclosed in response to pressure exerted upon the meter trip button 96, when the tank compartment 4 or 6 becomes substantially emptied.

It will be observed that, when the cam 250 is locked against the cam latch 252, as illustrated by FIG. 17, the latch member 280 occupies a position such that its right-hand end rests on the rear end of a lever 266, the front end of which is shown pivoted at 268. The said rear end of the lever 266 is thus confined to move back and forth about the pivot 268 in a horizontal slot between two fixed upper and lower plates 288 and 306. The lever 266 is normally biased into engagement with a stop 304 provided upon a plate 306 by a spring 270. The spring 270 engages one arm of a bell-crank lever 272 that is pivoted at 274 in order to maintain it in engagement with a fixed stop 276. The other arm of the bell-crank lever 272 is maintained by the spring 270 in engagement with a stop 278 that is mounted upon the lever 266. The stop 304 limits the pivotal movement of the lever 266 in the opposite direction.

Figure 15:
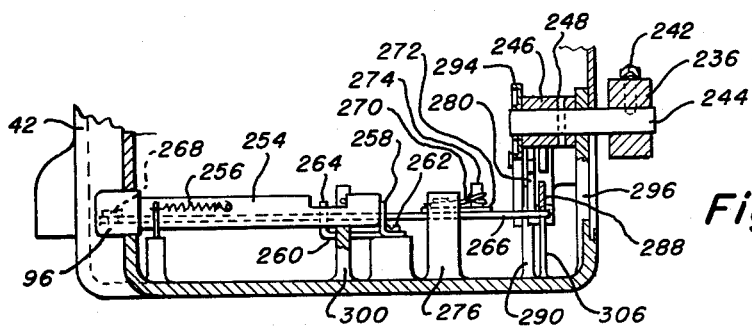
FIG. 15 is a section taken upon the line 15—15 of FIG. 17, looking in the direction of the arrows.

Pressure upon the meter trip button 96, as by means of the projection 98 of the piston 150, will result in longitudinal actuation, between guide brackets 300, of a rod 254, shown more particularly in FIGS. 14 and 15 as extending rearward of the button 96. This longitudinal actuation of the rod 254 is in opposition to the action of a spring 256, the function of which is to restore the rod 254 to its original position after the pressure on the meter trip button 96 has been released. The rod 254, in turn, presses against an upstanding portion 258, at the free end of one arm of a bell-crank lever 260, that is pivoted at 262. In response to this pressure upon the upstanding portion 258, an upstanding portion 264, at the free end of the other arm of the bell-crank lever 260, presses against the side of the lever 266. This results in pivotally actuating the lever 266 about its pivot 268, slightly toward the right, as viewed in FIG. 14, in opposition to the action of the spring 270.

This pivotal movement of the lever 266 results in its rear end becoming actuated toward the right, as viewed in FIG. 17, from beneath the latch member 280. This latch member 280 thereupon falls slightly downward, by gravity, about the pivot 282.

This slight falling movement of the latch member 280 releases the cam 250 of the cam lever 246 from its control by its cooperating cam latch 252. The cam 250 thereupon rides down the cam shoulder 286 of the cam latch member 280. Under the influence of the valve spring 210, the bell-crank lever 236, 246 thereupon turns counter-clockwise about the axis of the pivot 244. This action of the valve spring 210, of course, results in reseating the valve disc 206 and consequently reclosing the meter valve 94.

The lever 266 becomes restored to its original position, under the cam latch member 280, as illustrated in FIG. 17, by the spring 270, at the next counter-clockwise manual actuation of the lever 134 by the operator to reopen the meter valve 94, in opposition to the operation of the spring 210. At such time, the cam 250 will ride up the guiding cam shoulder 286, from the position shown in FIG. 17 into the position shown in FIG. 18. This will result in pivoting the cam latch member 280 counter-clockwise about the axis of the pivot 282, which will lift the right-hand end thereof above the horizontal plane of the lever 266. The rear end of the lever 266 becomes thus enabled to snap into place below the right-hand end of the cam latch lever 280. The cam 250 of the cam arm 246 will then fall back, by gravity, from the position shown in FIG. 18 into the position shown in FIG. 17, thus restoring its locking engagement with the cooperating cam latch 252.

At times when there is a substantial quantity of liquid in the tank compartment under consideration, therefore, the meter valve 94 is normally maintained closed by the spring 210, in order normally to maintain closed the before-described path of delivery of the liquid from the tank compartments through the meter 42. It may become opened by the operator manually actuating the lever 134 counter-clockwise, in opposition to the biasing action of the spring 210; but because of the action of the projection 98 of the section 150, it will not be maintained open thereafter automatically until the pressure of the liquid delivered from the tank compartment builds up to a sufficiently high value as determined by the strength of the spring 154, to actuate the piston 150 and its projection 98 to the left, as viewed in FIG. 6. It will thereafter remain open until the tank compartment becomes emptied to a degree such that a substantial amount of air begins to be delivered therefrom. The pressure of the liquid at the right of the piston 150, as viewed in FIG. 6, becomes thereupon released. Through the mechanism before described, pressure becomes thereupon exerted by the spring 154 upon the meter trip button 96, and this results in the reclosing of the meter valve 94.

The path of delivery of the oil from the tank compartment is therefore under a double control, both manual, by means of the lever 134, and automatic, under the control of the meter trip button 96. Even after manual opening by the lever 134, the path of delivery of the liquid is closed so long as, in the systems of FIGS. 1 to 6 and 10 to 13, for example, the projection 98 remains pressed into engagement with the meter trip button 96. When this pressure becomes released, however, upon the delivery of a substantial amount of air from the tank compartment, as before described, the meter valve 94 closes.

Many parts of the mechanisms employed in present-day liquid-delivering and metering systems that are employed also in the systems described above have not been referred to, or have been mentioned only incidentally. This is because they operate substantially the same in the present systems as in the present-day systems, and a detail description thereof, therefore, is not necessary here. Some such parts have been illustrated diagrammatically in the drawings. Among them, for example, is a one-way check valve 174, the operation of which is described more fully in the said application, Serial No. 50,551. Another such is a projection 284 for engaging the lever 266 when it is desired to open the valve 94 only slightly, instead of fully.

Further modifications will occur to persons skilled in the art, and all such are considered to fall within the spirit and scope of the present invention, as defined in the appended claims.

What is claimed is:

1. Liquid delivering and metering apparatus comprising a tank for containing the liquid, a meter, a valve, means whereby liquid may be delivered from the tank along a path to and through the meter and the valve, a spring operable normally to bias the valve closed at times when a substantial quantity of liquid is contained in the tank in order normally to close the path, thereby normally to prevent the delivery of the liquid from the tank along the path to and through the meter and the valve, means for opening the valve in opposition to the operation of the spring in order to open the path, thereby to permit the delivery of the liquid from the tank along the path to and through the meter and the valve, means operable in opposition to the operation of the spring for thereupon maintaining the valve open during the delivery of the liquid from the tank along the path to and through the meter and the valve comprising a link connected to the spring, a lever connected to the link and a cam for holding the link and the lever in position such as to oppose the action of the spring, a button connected to the lever, and means operable in response to a fall of pressure of the fluid delivered from the tank along the path resulting from the delivery of a substantial amount of air from the tank along the path for actuating the button to release the cam and thereby to render the maintaining means ineffective in order to permit the spring to reclose the valve and therefore the path and thus to prevent the delivery of any further fluid from the tank along the path to and through the meter and the valve, thereby to protect the meter against erroneous recordings arising out of the delivery of air through the meter.

2. Liquid delivering and metering apparatus comprising a tank for containing the liquid, a meter, a valve, control means, means for biasing the control means to a normal position in which it normally closes the valve, thereby normally to prevent the delivery of the liquid from the tank through the meter and the valve, means whereby the liquid may be delivered from the tank to and through the meter and the valve when the valve is open, means for manually opening the valve, means for subjecting the control means to the pressure exerted by the liquid as the liquid is delivered from the tank in order to actuate the control means out of the normal position in opposition to the action of the biasing means, means for establishing a mechanical connection between the control means and the valve for thereupon maintaining the valve open, the biasing means acting to restore the control means to the normal position upon the pressure to which the control means is subjected falling to a predetermined low value, and means for disestablishing the mechanical connection between the control means and the valve upon the control means becoming restored to the normal position in order mechanically to reclose the valve, thereby to prevent the delivery of any further fluid from the tank through the meter.

3. Liquid delivering and metering apparatus comprising a tank for containing the liquid, a meter, a valve, a cylinder having a chamber and a piston in the chamber for controlling the valve, means for biasing the piston to a normal position in the chamber in which it normally closes the valve, thereby normally to prevent the delivery of the liquid from the tank through the meter and the valve, means whereby the liquid may be delivered from the tank to and through the meter and the valve along a main path when the valve is open, means for manually opening the valve, means for connecting the cylinder in a branch path, means for subjecting the branch path to the pressure exerted by the liquid as the liquid is delivered from the tank in order to actuate the piston out of the normal position in opposition to subject the piston to the said pressure, thereby to the action of the biasing means, and means for maintaining the valve open, the biasing means acting to restore the piston to the normal position in the chamber upon the pressure to which the piston is subjected falling to a predetermined low value to effect the reclosing of the valve, thereby to prevent the delivery of any further fluid from the tank through the meter.

4. Liquid delivering and metering apparatus comprising a tank for containing the liquid, means for receiving the liquid from the tank and delivering it to a delivery hose including a meter, a normally closed valve and a control positioned at a single location upstream of said hose, means whereby the liquid may be delivered from the tank along a path to and through the meter and the valve to the delivery hose when the valve is open, means for opening the valve, the control being responsive to the pressure exerted by the liquid as the liquid is delivered from the tank to maintain the valve open after it has been opened, thereby to permit the delivery of the liquid from the tank along the path to and through the meter and the valve to the delivery hose, and means for reclosing the valve operable in response to a fall of the pressure of the fluid delivered from the tank along the path resulting from the delivery of a substantial amount of air from the tank along the path in order to prevent the delivery of any further substantial amount of fluid from the tank along the path to and through the meter and the valve, thereby to protect the meter against erroneous recordings arising out of the delivery of air through the meter.

5. Liquid delivering and metering apparatus comprising a tank for containing the liquid, means for receiving the liquid from the tank and delivering it to a delivery hose including a meter, a valve and a control positioned at a single location upstream of said hose, means whereby the liquid may be delivered from the tank along a path to and through the meter and the valve to the delivery hose when the valve is open, means operable normally to close the valve, thereby normally to prevent the delivery of the liquid from the tank along the path to and through the meter and the valve to the delivery hose, means for opening the valve, the control being responsive to the pressure exerted by the liquid as the liquid is delivered from the tank and operable in opposition to the operation of the closing means to maintain the valve open after it has been opened, thereby to permit delivery of the liquid from the tank along the path to and through the meter and the valve to the delivery hose, and means for rendering the maintaining means ineffective and operable in response to a fall of the pressure of the fluid delivered from the tank along the path resulting from the delivery of a substantial amount of air from the tank along the path in order to permit the closing means to reclose the valve and thus to prevent the delivery of any further substantial amount of fluid from the tank along the path to and through the meter and the valve, thereby to protect the meter against erroneous recordings arising out of the delivery of air through the meter.

6. Liquid delivering and metering apparatus comprising a tank for containing the liquid, means for receiving the liquid from the tank and delivering it to a delivery hose including a meter, a normally closed valve and a control position at a single location upstream of said hose, a pump, means for connecting the suction side of the pump to the tank and the delivery side of the pump to the meter and the valve in order to pump the liquid from the tank along a path to and through the meter and the valve to the delivery hose when the valve is open, means for opening the valve, the control being responsive to the pressure exerted by the liquid as the liquid is delivered from the tank to maintain the valve open after it has been opened, thereby to permit the delivery of the liquid from the tank along the path to and through the meter and the valve to the delivery hose, and means for reclosing the valve operable in response to a fall of the pressure of the fluid delivered from the tank along the path resulting from the delivery of a substantial amount of air from the tank along the path in order to prevent the pump delivering any further substantial amount of fluid from the tank along the path to and through the meter and the valve, thereby to protect the meter against erroneous recordings arising out of the delivery of air through the meter.

References Cited by the Examiner
UNITED STATES PATENTS

| 2,011,393 | 8/1935 | Bradley | 141—225 |
| 2,041,735 | 5/1936 | Young | 222—496 X |
| 2,258,637 | 10/1941 | Young et al. | 222—66 X |
| 2,330,703 | 9/1943 | Grise | 222—52 |
| 2,577,682 | 12/1951 | Hinds et al. | 222—73 X |
| 2,682,353 | 6/1954 | Bills et al. | 222—73 X |
| 2,703,190 | 3/1955 | Muller | 222—66 X |
| 3,005,476 | 10/1961 | Klaus | 141—217 |
| 3,012,526 | 12/1961 | Baldwin et al. | 222—496 X |

FOREIGN PATENTS 843,649    7/1939    France.

LOUIS J. DEMBO, *Primary Examiner.*

LAVERNE D. GEIGER, RAPHAEL M. LUPO,
*Examiners.*